(12) United States Patent
Horii et al.

(10) Patent No.: US 8,838,874 B2
(45) Date of Patent: Sep. 16, 2014

(54) METHOD, PROGRAM, AND SYSTEM FOR PROCESSING OBJECT IN COMPUTER

(75) Inventors: Hiroshi Horii, Kanagawa-ken (JP); Kiyokuni Kawachiya, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 448 days.

(21) Appl. No.: 13/287,242

(22) Filed: Nov. 2, 2011

(65) Prior Publication Data
US 2012/0124018 A1    May 17, 2012

(30) Foreign Application Priority Data

Nov. 12, 2010  (JP) ................................ 2010-253987

(51) Int. Cl.
*G06F 12/02* (2006.01)
*G06F 9/455* (2006.01)
*G06F 9/44* (2006.01)

(52) U.S. Cl.
CPC .......... *G06F 9/4428* (2013.01); *G06F 9/45504* (2013.01)
USPC ............... 711/6; 717/140; 717/148; 717/153; 711/202

(58) Field of Classification Search
CPC ............................ G06F 8/443; G06F 9/45516
See application file for complete search history.

(56) References Cited

U.S. PATENT DOCUMENTS

| 5,949,973 A * | 9/1999 | Yarom .............................. 726/23 |
| 6,247,027 B1 * | 6/2001 | Chaudhry et al. ..................... 1/1 |
| 6,904,589 B1 * | 6/2005 | Kolodner et al. ............. 717/116 |
| 7,509,338 B1 * | 3/2009 | Tarditi .................................. 1/1 |
| 2005/0080980 A1 | 4/2005 | Wu et al. |
| 2009/0307431 A1 * | 12/2009 | Garst et al. .................... 711/132 |
| 2010/0114998 A1 * | 5/2010 | Steensgaard et al. ......... 707/813 |

FOREIGN PATENT DOCUMENTS

JP        2004-078750 A     3/2004

OTHER PUBLICATIONS

Erik Corry, "Optimistic stack allocation for java-like languages", International Symposium on Memory Management archive, Proceedings of the 5th international symposium on Memory management table of contents, Ottawa, Ontario, Canada, pp. 162-173, 2006.
Kevin Cleereman, Michelle Cheatham, "Runtime Support of Speculative Optimization for Offline Escape Analysis", ( http://knoesis.wright.edu/library/publications/SERP-07-EscapeAnalysis.pdf ) Masafumi Takeda/Japan/IBM Dec. 18, 2010.

\* cited by examiner

*Primary Examiner* — Sangwoo Ahn
(74) *Attorney, Agent, or Firm* — Jeff Tang

(57) ABSTRACT

A method, an article of manufacture, and system for heapifying an object. The method includes: storing, in a working set, a first address of a certain object in a stack frame, copying the certain object into the heap area and holding a second address of the certain object in the heap area, following each stack frame to find a pointer pointing to the first address stored in the working set, converting the address that the pointer points to into the second address, proceeding to a next stack frame, where the address conversion includes storing an address of another object in the working set if the converted address is stored as a value of a field of the other object in the stack frame, and terminating the process in response to a lack of pointers found in the stack frame to point to the addresses stored in the working set.

7 Claims, 7 Drawing Sheets

METHOD, PROGRAM, AND SYSTEM FOR PROCESSING OBJECT IN COMPUTER

CROSS-REFERENCE TO RELATED APPLICATION

This application claims priority under 35 U.S.C. §119 from Japanese Patent Application No. 2010-253987 filed Nov. 12, 2010, the entire contents of which are incorporated herein by reference.

BACKGROUND OF THE INVENTION

1. Field of the Invention

The present invention generally relates to processing of an object in a computer processing system and, more particularly, to processing in which an object allocated to a stack is copied to a heap.

2. Related Art

Conventionally, in a processing system such as one based on Java®, an object generated in a method upon calling of the method and no longer used after the completion of the processing of the method can be allocated on a stack of the processing thread. However, if methods are frequently called such as through recursive calls, the stack area can be used up to cause stack overflow. As such, a process of reducing the stack size is performed by copying an object in the stack area into a heap and shifting stack frames.

In another case, in a work stealing process in the Fork-Join framework of Java®, a task object generated in a method can be allowed to be processed by other threads to ensure that the process waits until the completion of the processing of the task object. In this case, the task object can be placed on the stack. Here, if a thread other than a thread that has generated the task object will process the task object, a process of copying the task object from the stack into the heap is necessary before processing of the task for safety of the processing system.

Such a process in which an object allocated to the stack is allocated to the heap will be referred to as heapification. Hereinafter, for convenience, an object allocated on a stack will be referred to as a stack object, and an object copied from a stack to the heap will be referred to as a heapified object.

However, the process is not completed simply by copying the object from the stack into the heap. It is necessary to make the other stack objects correctly point to the copied heapified object. A series of process steps for this purpose will be described with reference to FIGS. 1 to 3.

FIG. 1 shows a stack 102 and a heap 104 in computer memory. The stack 102 includes stack frames 102a, 102b, etc., each corresponding to a method call in a thread.

As shown, a stack object 106 and a local variable 108 are placed in the stack frame 102a, and a stack object 112 with a field variable 112a is placed in the stack frame 102b.

For example, the arrangement of the stack objects and the variables as in FIG. 1 corresponds to a state in the following code in which "bar" is being processed upon request of processing of "foo".

```
class S {
}
class T {
    S a;
}
void foo ( ) {
    S a = new S ( );
    bar (a);
}
void bar (S a) {
    T b = new T ( );
    b.a = a;
    ...
}
```

Now, it is assumed that, through functionality of a Java® Virtual Machine or an operating system, the stack object 106 is copied into the heap 104 to become a heapified object 202, as shown in FIG. 2.

Then, when the address of the heapified object 202 is an address B, the heapification requires that an address A that has pointed to the stack object 106 in the stack frames be rewritten to the address B, as shown in FIG. 3.

For this purpose, the Java® Virtual Machine or the operating system should perform a process of sequentially scanning the stack frames to rewrite variables pointing to the address A of the original stack object 106 to point to the address B of the heapified object 202. Since it is not known which stack frames include variables pointing to the address of the unheapified stack object, all stack objects need to be scanned, which is a process requiring long time.

A technique disclosed in Erik Corry, "Optimistic stack allocation for java-like languages", International Symposium on Memory Management archive, Proceedings of the 5th international symposium on Memory management table of contents, Ottawa, Ontario, Canada, Pages: 162-173, 2006 involves temporarily allocating an object to the stack, and upon escaping, copying the object into the heap. In this technique, the stack is configured on a loop basis rather than on a method frame basis, and loop areas called after an area to which the object is allocated are scanned to reestablish references.

Also in a technique disclosed in Kevin Cleereman, Michelle Cheatham, "Runtime Support of Speculative Optimization for Offline Escape Analysis", (http://knoesis.wright.edu/library/publications/SERP-07-EscapeAnalysis.pdf), only frames above a stack frame to which an object is allocated are scanned.

However, the above conventional art does not disclose techniques of reducing the time it takes to scan stack frames.

SUMMARY OF THE INVENTION

One aspect of the invention includes a computer implemented method for heapifying an object included in a stack frame of a stack. The method includes the steps of: storing, in a working set, a first address of a certain object in a stack frame to be copied into a heap area, copying the certain object into the heap area and holding a second address of the certain object in the heap area, following each stack frame sequentially to find a pointer pointing to the first address stored in the working set, converting, upon finding the pointer, the address that the pointer points to into the second address in the heap area, proceeding to a next stack frame, where the address conversion includes storing an address of another object in the working set if the converted address is stored as a value of a field of the other object in the stack frame, and terminating the process in response to a lack of pointers found in the stack frame to point to the addresses stored in the working set, where at least one step is carried out using a computer device.

Another aspect of the invention includes an article of manufacture tangibly embodying computer readable non-transitory instructions which, when implemented, cause a computer to carry out the steps of a method, where the method includes the steps of: storing, in a working set, a first address of a certain object in a stack frame to be copied into a heap area, copying the certain object into the heap area and holding a second address of the certain object in the heap area, following each stack frame sequentially to find a pointer pointing to the first address stored in the working set, converting, upon finding the pointer, the first address that the pointer points to into the second address in the heap area, proceeding to a next stack frame, wherein the address conversion includes storing an address of another object in the working set if the converted address is stored as a value of a field of the other object in the stack frame, and terminating the process in response to no pointers found in the stack frame to point to the addresses stored in the working set.

Yet another aspect of the invention includes a computer system for heapifying an object included in a stack frame of a stack. The system includes: means for storing, in a working set, a first address of a certain object in a stack frame to be copied into a heap area, means for copying the certain object into the heap area and holding a second address of the certain object in the heap area, means for following each stack frame sequentially to find a pointer pointing to the first address stored in the working set, means for converting, upon finding the pointer, the address that the pointer points to into the second address in the heap area, means for proceeding to a next stack frame, where, if the converted address is stored as a value of a field of an object in the stack frame, the address conversion includes storing an address of the object in the working set, and means for terminating the process in response to no pointers found in the stack frame to point to the addresses stored in the working set.

DETAILED DESCRIPTION OF THE PREFERRED EMBODIMENTS

Thus, it is an object of the present invention to provide a technique of reducing the time it takes to stack scan for address rewriting which becomes necessary when an object allocated to a stack is allocated to a heap.

The present invention has been made for solving the above problem. First, a processing system provided with functionality of the present invention adds an address A of a heapified stack object to a working set, which is preferably a dedicated memory area in the heap, and scans stacks.

The processing system detects a stack frame to which the address A is allocated, and sets the detected stack frame as a current stack frame. If a variable pointing to the address added to the working set is found in the current stack frame, the processing system rewrites the variable to an address of the corresponding heapified object.

If a field of a stack object in the current stack frame points to the address included in the working set, the processing system adds an address of the stack object to the working set.

If the current focus stack frame includes a pointer to an address included in the working set, the processing system proceeds to a next stack frame.

If the current focus stack frame does not include a pointer to an address included in the working set, the processing system terminates the stack scan at that point.

Terminating the stack scan at this point is a process based on findings of the present invention that, if the current focus stack frame does not include a pointer to an address included in the working frame, subsequent stack frames no longer need to be reviewed because they do not include a pointer to an address included in the working set.

According to the present invention, in stack frame scan for pointer rewriting in a heapification process, the scan can be terminated without scanning all stack frames. This enables a fast heapification process.

Embodiments of the present invention will be described below with reference to the drawings. It is to be understood that these embodiments are for describing preferred aspects of the present invention and not intended to limit the scope of the present invention to what is set forth herein. Throughout the drawings, like symbols refer to like elements unless otherwise specified.

Figure 1:
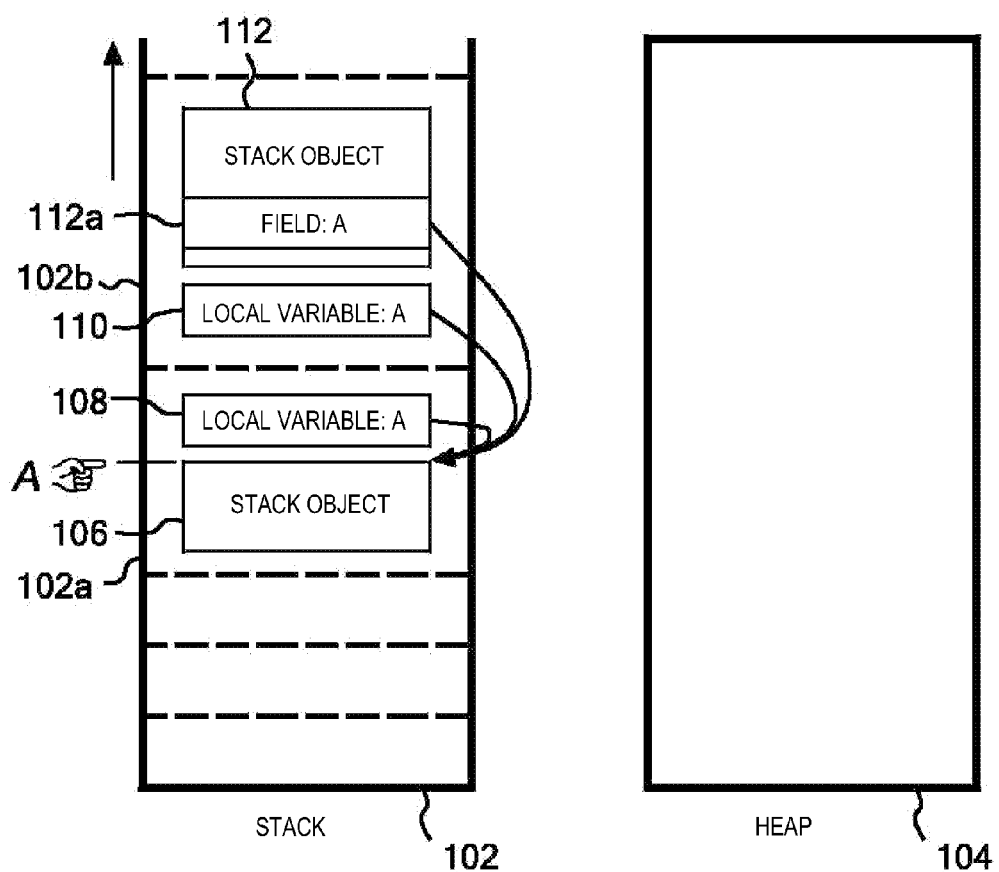
FIG. 1 is a diagram schematically showing the manner of a heapification process according to the prior art.
Figure 2:
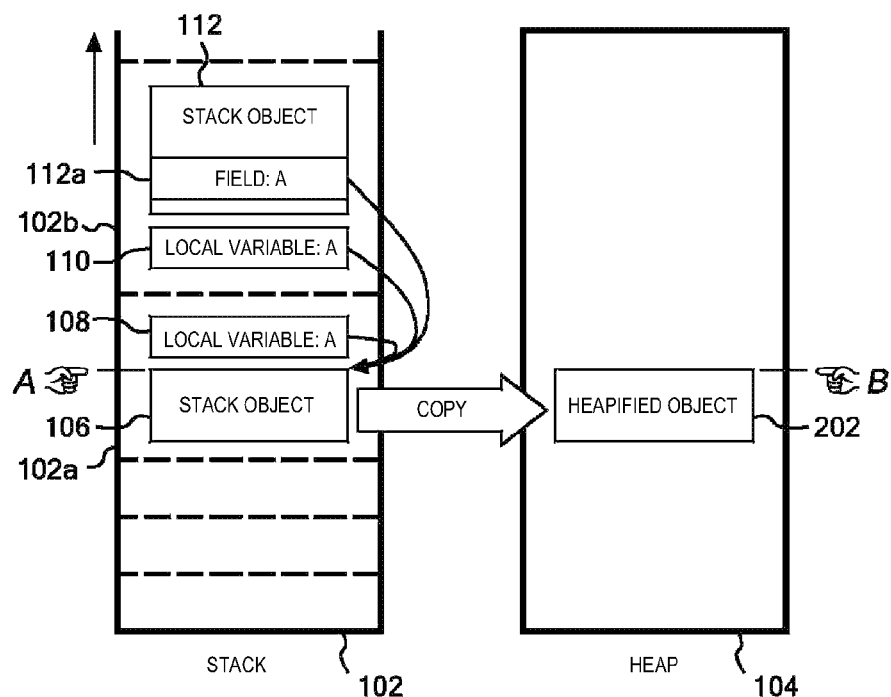
FIG. 2 is a diagram schematically illustrating the manner of the heapification process according to the prior art.
Figure 3:
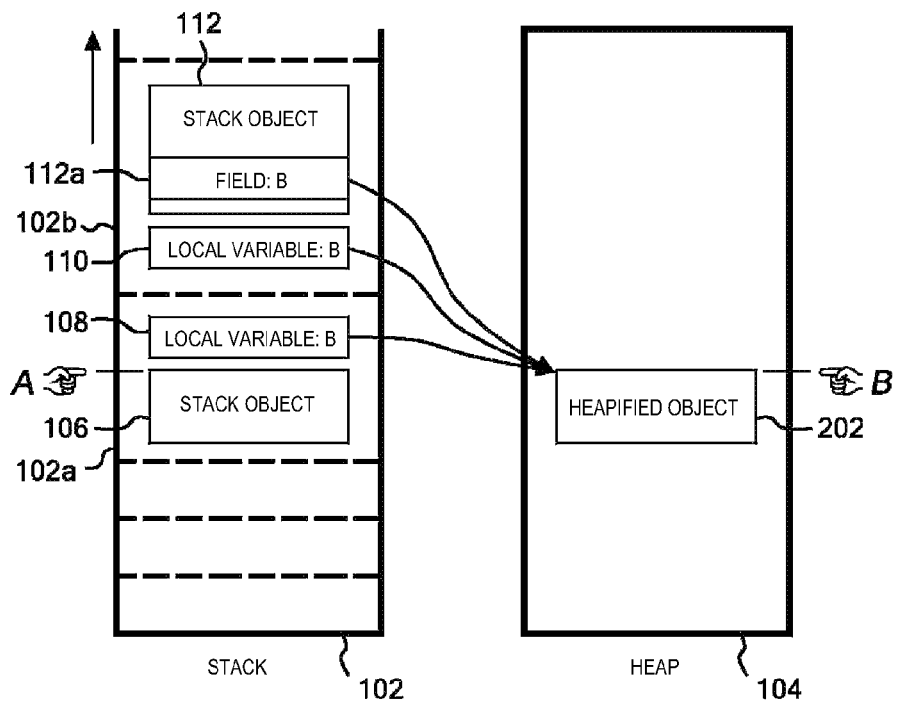
FIG. 3 is a diagram schematically illustrating the manner of the heapification process according to the prior art.
Figure 4:
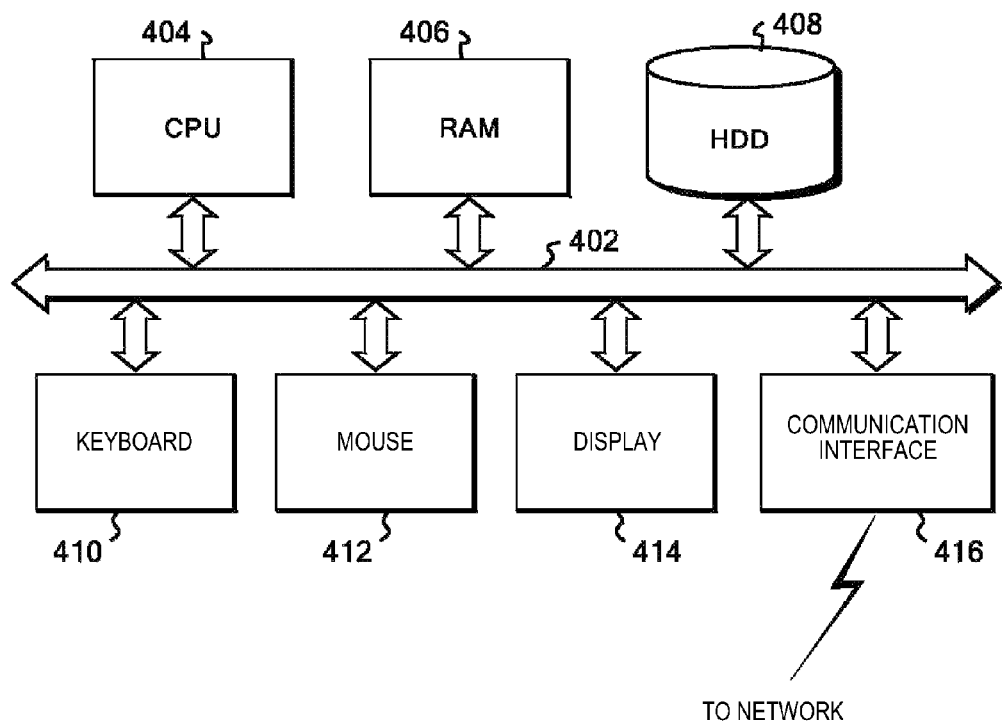
FIG. 4 is a block diagram of exemplary hardware for implementing the present invention.

With reference to FIG. 4, a block diagram of computer hardware for implementing a system configuration and a process according to an embodiment of the present invention is shown.

In FIG. 4, a CPU 404, a main memory (RAM) 406, a hard disk drive (HDD) 408, a keyboard 410, a mouse 412, and a display 414 are connected to a system bus 402. The CPU 404, preferably based on a 32-bit or 64-bit architecture, can be Pentium™ 4 of Intel Corporation, Core™ 2 DUO or Xeon™ of Intel Corporation, or Athlon™ of Advanced Micro Devices, Inc., for example. The main memory 406 preferably has a capacity of 2 GB or more, or more preferably a capacity of 4 GB or more.

Figure 5:
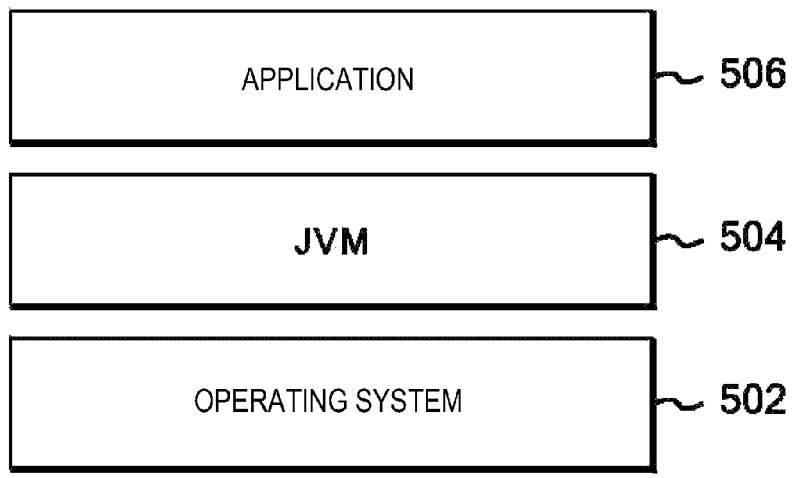
FIG. 5 is a diagram illustrating layers of functional blocks of a processing environment.

The hard disk drive 408 stores an operating system 502 (FIG. 5). The operating system can be any one compatible with the CPU 404, such as Linux™, or Windows™ 7, Windows XP™, or Windows™ 2003 server of Microsoft Corporation, or Mac OS™ of Apple Inc. The hard disk drive 408 also stores a program, preferably such as Apache, for operating the system as a web server. The program is loaded into the main memory 406 upon system startup.

The hard disk drive 408 further stores a Java® Runtime Environment program for realizing a Java® Virtual Machine (JVM) 504 (FIG. 5). The program is loaded into the main memory 406 upon system startup. The JVM 504 implements heapification functionality according to the present invention.

The hard disk drive 408 further stores bytecode 506 (FIG. 5) of an application program.

The keyboard 410 and the mouse 412 are used for operating graphic objects such as an icon, a task bar, and a window displayed on the display 414 according to a graphic user interface provided by the operating system 502.

The display 414 is preferably, although not limited to, a 32-bit true-color LCD monitor with a resolution of 1024×768 or higher.

A communication interface 416 is preferably connected to a network according to an Ethernet (R) protocol. Through functionality provided by Apache, the communication interface 416 receives a processing request from a client computer (not shown) or returns a processing result to a client computer (not shown) according to a communication protocol such as TCP/IP.

FIG. 5 is a diagram showing software layers. In FIG. 5, the bottom layer is the operating system 502.

The JVM 504 compatible with the operating system 502 operates on the operating system 502.

The bytecode of the application 506 operates on the JVM 504. During the operation of the application 506, the JVM 504 monitors the state of the system and performs a process of stack size reduction or work stealing, thereby performing a heapification process.

Now, with reference to flowcharts in FIGS. 6 and 7 and examples in FIGS. 8 and 9, the heapification process by the JVM 504 will be described in more detail. In step 602, the JVM 504 copies an address A of a stack object 106 to be heapified into a heap 804, and identifies an address B at the copy destination. The JVM 504 copies the stack object 806 to the address B. The result of the copying is a heapified object 808.

In step 604, the JVM 504 puts an address A in a reachable object set (working set) WS. Although not shown, the working set WS is preferably a dedicated area in the heap 802. The working set WS preferably consists of an array for storing addresses.

In step 606, the JVM 504 sets, as $f_{start}$, a stack frame $f_{current}$ found as a result of searching for a stack frame in which the address A is specified.

Now, with reference to a flowchart in FIG. 7, the prNocess in step 606 will be described in more detail. In step 702 in FIG. 7, the JVM 504 specifies the address A of the stack object 806 to be heapified.

In step 704, the JVM 504 identifies a stack S to which the address A is allocated. Here, the stack S is the stack 802 shown in FIG. 8.

In step 706, the JVM 504 identifies a method frame corresponding to a method first called in the stack S and sets the identified method frame as $f_{current}$. It is assumed here that the identified method frame is a stack frame 802d shown in FIG. 8.

In step 708, the JVM 504 determines whether $f_{current}$ includes the address A. In the example of FIG. 8, the stack frame 802a does not include the address A. Therefore the process proceeds to step 710, where a method frame 802b corresponding to a method called next to $f_{current}$ is set as the next $f_{current}$.

By repeating steps 708 and 710 in this manner, stack frames are sequentially scanned in the order of the stack frame 802a→the stack frame 802b→a stack frame 802c→a stack frame 802d. When the stack frame 802d is reached, the determination in step 708 is positive because the stack frame 802d includes a variable pointing to the address A. Therefore the process transitions to step 712, where $f_{current}$ is set as $f_{start}$. The process then returns to step 606.

Figure 6:
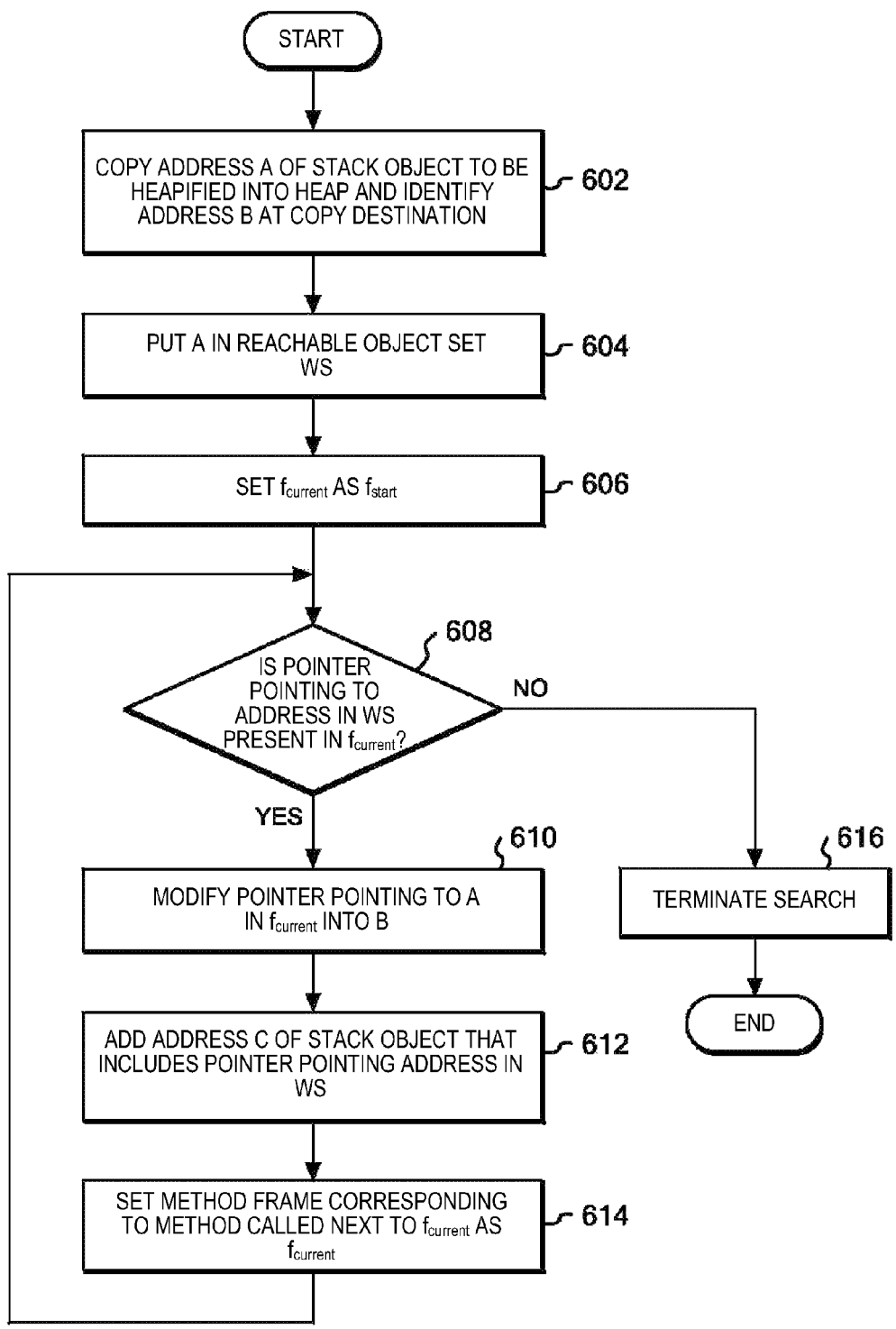
FIG. 6 is a diagram illustrating a processing flowchart for a heapification process of the present invention.
Figure 7:
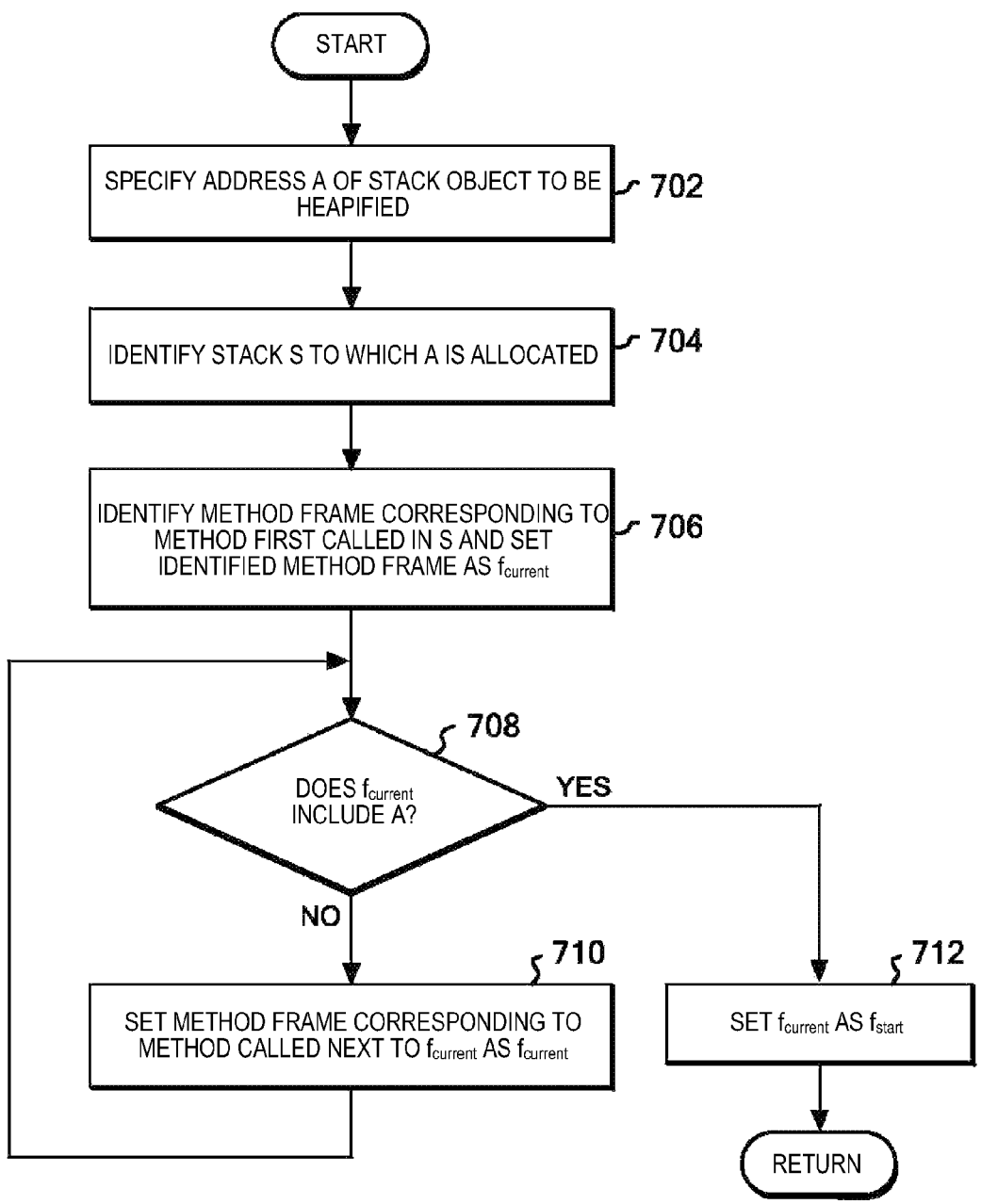
FIG. 7 is a diagram illustrating a processing flowchart for the heapification process of the present invention.

Returning to the flowchart in FIG. 6, the JVM 504 then determines whether a pointer pointing to the address in the working set WS is present in the stack frame $f_{current}$ in step 608.

Figure 8:
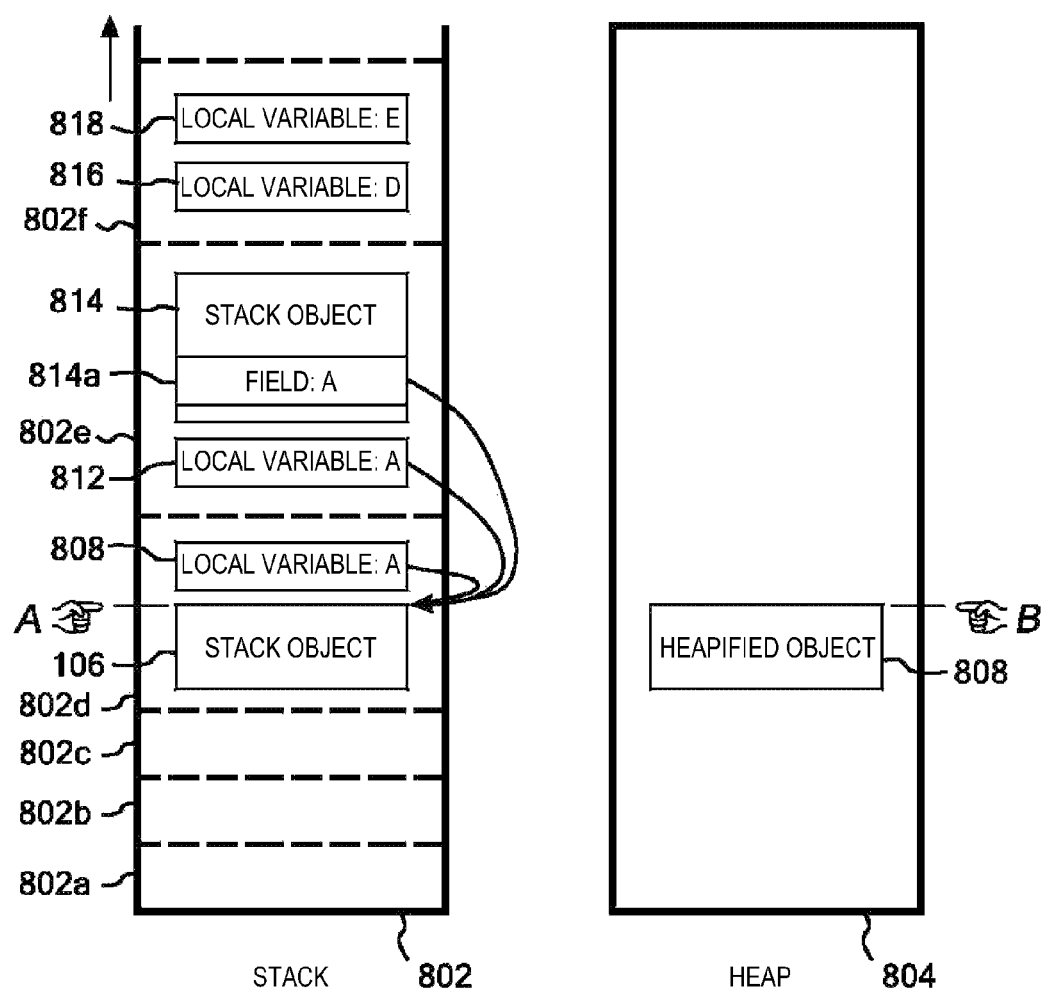
FIG. 8 is a diagram schematically illustrating the manner of the heapification process according to the present invention.
Figure 9:
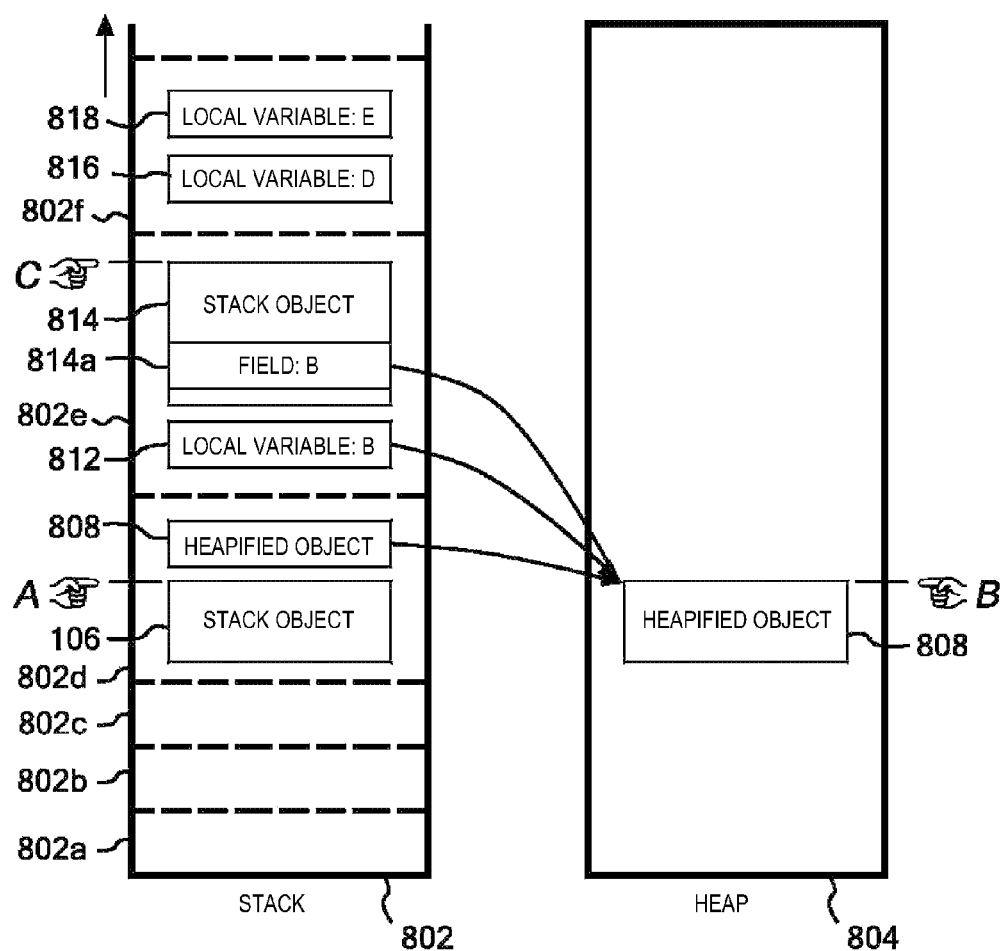
FIG. 9 is a diagram schematically illustrating the manner of the heapification process according to the present invention.

In the example of FIG. 8, since $f_{current}$ is currently the stack frame 802d, a pointer pointing to the address A in the working set WS is present. Therefore the determination in step 608 is positive, and in step 610, the variable (pointer) pointing to the address A in $f_{current}$ rewritten to the address B pointing to the heapified object 808 shown in FIG. 8.

In the stack frame 802d, the variable is a local variable 808.

In step 612, if the current stack frame 802d includes a stack object including a pointer pointing to the address in the working set WS, the JVM 504 adds the address of such a stack object to the working set WS. Since the stack frame 802a does not include the address of such a stack object, step 612 is not performed.

In step 614, a method frame corresponding to a method called next to the $f_{current}$ is set as $f_{current}$. That is, in FIG. 8, a stack frame 802e next to the stack frame 802d becomes $f_{current}$.

In the stack frame 802e as $f_{current}$, pointers pointing to the address A in the working set WS are present. Therefore the determination in step 608 is positive, and in step 610, the pointers pointing to the address A in $f_{current}$ are rewritten to the address B pointing to the heapified object 808 shown in FIG. 8. In the stack frame 802e, a local variable 812 and a field 814a of the stack object 814 point to the address A. Therefore these pointers are rewritten to B as shown in FIG. 9.

In step 612, the JVM 504 adds, to the working set WS, an address C of the stack object 814 that includes the pointers pointing to the address in the working set WS. In step 614, a method frame corresponding to a method called next to $f_{current}$ is set as $f_{current}$. That is, in FIG. 9, a stack frame 802f next to the stack frame 802e becomes $f_{current}$.

When the process returns to the determination in step 608, the addresses included in the working set WS are A and C. The stack frame 802f includes only a local variable 818 pointing to E and a local variable 816 pointing to D, and does not include a local variable pointing to A nor a local variable pointing to C. Therefore the determination in step 608 is negative, and the JVM 504 terminates the search of stack frames in step 616.

The above process will be described with the following exemplary source code for method calls, where each method call below corresponds to one stack frame.

```
void foo ( ) {
// It is assumed that the address A is allocated to the stack here.
Object x = new Object ( );
bar (x);
}
void bar (Object y) {
System, out. println (y);
barbar ( );
}
void barbar ( ) {
barbarbar ( )
}
void barbarbar ( ) {
...
}
```

In the above code, the frame of bar (Object) can access the object allocated to the stack, but the frame of barbar ( ) cannot access the object allocated to the stack.

If heapification is performed during execution of barbarbar ( ) pointers (in the following example, x and y) to the stack-allocated object need to be rewritten in foo ( ) and bar (Object).

However, since barbar ( ) does not include a pointer to A, barbarbar ( ) inevitably does not include a pointer to A. That is, it is assured that the search can be performed up to barbar ( ) and terminated.

Thus, the heapification process in a case that Java® bytecode is executed on a JVM has been described. A code generated by a JIT compiler can use the process according to the present invention by calling a JVM method that performs the heapification according to the present invention.

Although the embodiments of the present invention have been described in association with a particular platform such as a JVM, the present invention is not limited to implementation on such a particular platform but can be implemented on any computer platform.

Further, the heapification process can be performed by an operating system rather than a JVM.

What is claimed is:

1. A computer implemented method for heapifying an object included in a stack frame of a stack, the method comprising the steps of:
   storing, in a working set, a first address of an object in a stack frame to be copied into a heap area;
   copying the object into the heap area and holding a second address of the object in the heap area;
   following each stack frame sequentially to find a pointer pointing to the first address stored in the working set;
   converting, upon finding the pointer, the first address into the second address in the heap area;
   proceeding to a next stack frame, wherein the address conversion includes storing an address of another object in the working set if the converted address is stored as a value of a field of the other object in the stack frame;
   wherein at least one of the above steps is carried out using a computer device.

2. The method according to claim 1, wherein the steps are executed on a Java (R) Virtual Machine.

3. The method according to claim 1, further comprising: terminating the process in response to a lack of pointers found in the stack frame to point to the addresses stored in the working set.

4. An article of manufacture tangibly embodying computer readable medium non-transitory instructions which, when implemented, cause a computer to carry out the steps of a method comprising:
   storing, in a working set, a first address of a certain object in a stack frame to be copied into a heap area;
   copying the certain object into the heap area and holding a second address of the certain object in the heap area;
   following each stack frame sequentially to find a pointer pointing to the first address stored in the working set;
   converting, upon finding the pointer, the first address that the pointer points to into the second address in the heap area;
   proceeding to a next stack frame, wherein the address conversion includes storing an address of another object in the working set if the converted address is stored as a value of a field of the other object in the stack frame; and
   terminating the process in response to no pointers found in the stack frame to point to the addresses stored in the working set.

5. The article according to claim 4, wherein the steps are executed on a Java (R) Virtual Machine.

6. A system for heapifying an object included in a stack frame of a stack, the system comprising:
   a memory;
   a processor device communicatively coupled to the memory; and
   a java virtual machine communicatively coupled to the memory and the processor device, wherein java virtual machine module is configured to perform the steps of a method comprising:
   storing, in a working set, a first address of a certain object in a stack frame to be copied into a heap area;
   copying the certain object into the heap area and holding a second address of the certain object in the heap area;
   following each stack frame sequentially to find a pointer pointing to the first address stored in the working set;
   converting, upon finding the pointer, the address that the pointer points to into the second address in the heap area;
   proceeding to a next stack frame, wherein the address conversion includes storing an address of another object in the working set if the converted address is stored as a value of a field of the other object in the stack frame; and
   terminating the process in response to no pointers found in the stack frame to point to the addresses stored in the working set.

7. The system according to claim 6, wherein the computer system for heapifying an object employs a Java (R) Virtual Machine.

* * * * *